May 20, 1969 O. H. GRANGAARD, JR 3,444,738

SELF-OSCILLATING IMPEDANCE MEASURING LOOP

Filed Aug. 25, 1967

INVENTOR.
ORRIN H. GRANGAARD JR
BY Charles J. Ungemach
ATTORNEY

INVENTOR.
ORRIN H. GRANGAARD JR.
BY Charles J. Ungemach
ATTORNEY

United States Patent Office 3,444,738
Patented May 20, 1969

3,444,738
SELF-OSCILLATING IMPEDANCE MEASURING LOOP
Orrin H. Grangaard, Jr., St. Paul, Minn., assignor to Honeywell Inc., Minneapolis, Minn., a corporation of Delaware
Filed Aug. 25, 1967, Ser. No. 663,298
Int. Cl. G01f 3/00
U.S. Cl. 73—304                                    11 Claims

ABSTRACT OF THE DISCLOSURE

A completely electronic liquid level measuring apparatus comprising a frequency selective network, an integrator circuit, and a variable gain amplifying circuit arranged in a series loop. The loop circuit is designed to oscillate. A capacitor in the integrating circuit senses changes in liquid level which tends to change the loop gain and therefore the amplitude of the oscillations, but the amplifying circuit has a variable gain characteristic which keeps the amplitude of the oscillations constant and develops a D-C voltage which is proportional to the liquid level.

Background of the invention

This invention pertains to the measurement of liquid level with apparatus employing immersible electrodes. The electrodes may take many forms, e.g., the specific electrodes shown as employed in this invention form a capacitor having a capacity which is a function of the liquid level.

As far as it is known, the apparatus disclosed in United States application, Ser. No. 386,307, now Patent No. 3,344,668 is representative of the state of the art. That apparatus may generally be classified as electromechanical whereas the present apparatus is electronic. The electronic apparatus is far more practical and reliable than the electromechanical one.

In some oscillating systems the sensing capacitor is arranged in a resonant circuit and the frequency of the resonant circuit varies in accordance with the liquid level. A converter or discriminator is usually necessary in this type of a system to convert the frequency modulated signal to one appropriate for energizing an indicator. See for example, United States Patents 2,621,517 and 2,354,964. In other systems, an independent constant frequency oscillator provides a source across which the sensing capacitor is placed, a current thereby being produced which varies in accordance with the impedance of the sensor which in turn depends upon the liquid level. The current drives a meter which indicates liquid level. See for example U.S. Patents 3,161,054 and 2,908,166. In still other systems the system oscillates with either the presence or absence of fluid at the sensor, but not in both instances. In other words, the indication of liquid level is at discreet levels rather than at all levels. See for example U.S. Patent 3,254,333.

Summary

The invention comprises an integrator circuit, frequency selective network, and a variable gain amplifier arranged in a series loop. The overall phase shift of the loop will, at a known frequency, be zero and the overall gain of the loop is set to be a constant, e.g., 1, so that the loop is self-oscillating. The integrator circuit comprises an impedance, e.g., a capacitance which has a value indicative of the quantity being measured, e.g., fluid level. As the capacitance changes the amplitude of the oscillations tends to change but the gain of the variable gain amplifier is automatically adjusted to keep the amplitude constant. The variable gain amplifier limits the peak-to-peak amplitude of the oscillations and in this way the gain with respect to the fundamental frequency is controlled. The frequency selective network acts to filter the output of the variable gain amplifier and also sets the oscillation frequency of the loop. A D-C voltage is generated by the variable gain amplifier which is proportional to the A-C gain of the amplifier and therefore is also proportional to the capacitance which is indicative of the fluid level.

Description of the preferred embodiment

Figure 1:
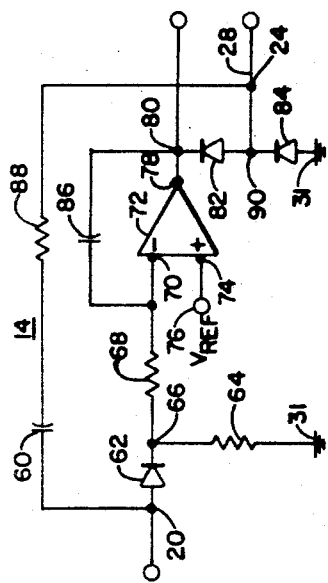
FIGURE 1 is a block diagram showing the basic configuration of the system.

The basic system of FIGURE 1 comprises a frequency selective network 10 having input terminal 26 and output terminal 30, an integrator 12 having an input terminal 16 and an output terminal 18, and a variable gain amplifier 14 having an input terminal 20 and an output terminal 24. Lead 32 connects output terminal 30 of network 10 to input terminal 16 of integrator 12, lead 22 connects output terminal 18 of integrator 12 to input terminal 20 of variable gain amplifier 14, and lead 28 connects output terminal 24 of amplifier 14 to input terminal 26 of network 10. Integrator 12 comprises a resistor 34, a high gain AC amplifier 36, and a capacitor 38. Amplifier 36 has an input terminal 13 and its output terminal is common with terminal 18. Resistor 34 is connected between terminals 16 and 13. Capacitor 38 is connected between terminals 13 and 18. Capacitor 38 functions as the fluid level sensor and accordingly is shown as being variable. A capacitor 42 shown with dashed line leads is connected between terminal 18 and ground reference potential 31. Capacitor 42 represents the capacity between the lead connecting capacitor 38 to terminal 18, and ground. In the fluid level sensing art this lead is often called the low impedance lead, and capacitor 42 represents the capacitive loading effect to ground at the low impedance lead. A capacitor 44 shown with dashed line leads is connected between terminal 13 and ground potential 31. Capacitor 44 represents the capacity between the lead connecting capacitor 38 to terminal 13, and ground. This lead is often referred to as the high impedance lead and capacitor 44 represents the capacitive loading effect to ground at the high impedance lead. The capacitive loading effect to ground at terminal 18 will not adversely affect system performance if the output impedance of amplifier 36 is sufficiently low. The capacitive loading effect to ground at terminal 13 will not adversely affect system performance if the ratio of the open loop gain of amplifier 36 is sufficiently high with respect to its closed loop gain. For this reason it is important that the gain of A–C amplifier 36 be sufficiently high. Therefore, placing the capacitive sensor in the feedback loop of a high gain A-C amplifier of the type described will limit the capacitive loading effect. Furthermore, the use of feedback techniques at this critical point in the measurement system lends good stability to the system in the event of parameter and environmental changes. The basic system shown in FIGURE 1 is primarily designed for use as a fuel quantity indicator in places where there is a no A-C voltage supply available.

It will be seen that this system is a very efficient one in that it represents an approach whereby fuel measurement is a by-product of the process of generating an A-C waveform. In other words, the system described by FIGURE 1 is a self-oscillating system.

The operation of the loop circuit shown in FIGURE 1 depends on the positive feedback path through amplifier 14. If the overall loop gain is some predetermined value, e.g., 1, oscillations will be present throughout the loop. The overall loop gain is primarily determined by the capacitance of capacitor 38 and the gain of amplifier 14. It can be shown that sustained oscillations will occur if and only if the gain of amplifier 14 is proportional to the capacity of capacitor 38.

The gain characteristic of variable gain amplifier 14 must be such with respect to the other circuit components that sustained unmodulated oscillations are generated. This statement requires some clarification.

The loop circuit of FIGURE 1 operates as an oscillator and the transfer function of any oscillator must include a term of the following form:

$$\frac{E_{out}}{E_{in}} = \frac{1}{s^2 + Ks + 1} \cdot G'$$

where $s$ is the complex algebra operator, K is a constant and $G'$ is a disturbing function. The coefficient K is determined by the gain of amplifier 14. Sustained oscillations will occur in the loop circuit only if the coefficient K is equal to zero. Assuming that the coefficient K is equal to zero and oscillations are present, the amplitude of the oscillations will be solely determined by the magnitude of the disturbing function $G'$. In the presence of noise (and all circuits are inherently noisy) there is a continuing succession of disturbing functions and some method must be used to keep the level of oscillations within the liner operating region of the various circuit components. If the level of oscillations increase prohibitively, the coefficient K must be made slightly positive to cause the amplitude of the oscillations to return within acceptable limits. On the other hand, if the level of oscillations decreases prohibitively, the coefficient K must be made slightly negative to cause the amplitude of these oscillations to return within acceptable limits. Therefore, in a noisy environment, the oscillations can be amplitude modulated and to prevent this, some form of AGC (automatic gain control) is required. The frequency response of the AGC circuitry must be adequate, i.e., the circuitry must correct rapidly but without overshoot for severe disturbing functions. If the AGC circuitry does not respond quickly enough, the envelope of the oscillations may oscillate between some saturation level and zero, which obviously would be undesirable. In practice the most severe disturbing function usually occurs at the instant the system is first energized. Since the coefficient K need deviate only very slightly from zero to cause very rapid changes in the envelope of the oscillations, it is important that the automatic gain control circuitry be sufficiently damped so as to have no overshoot. At the same time, the automatic gain control circuitry must be sufficiently fast so as to preclude the possibility that some circuit component may go into saturation. If saturation occurs, the D-C bias levels throughout the circuit become disturbed and when the automatic gain control causes the circuit to come out of saturation, another disturbing function is generated as the bias levels restabilize. Therefore the automatic gain control circuitry chosen and the response time thereof are critical.

Figure 2:
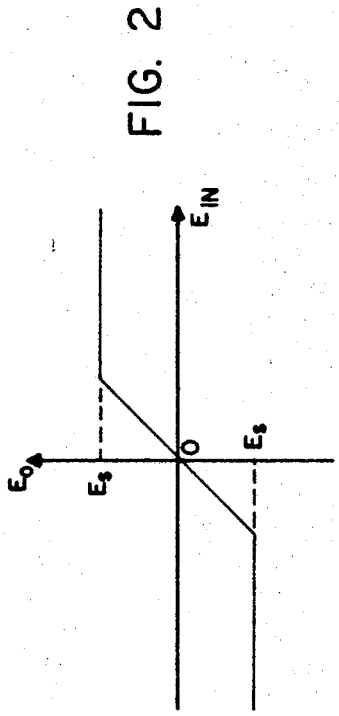
FIGURE 2 illustrates the gain characteristic of a variable gain amplifier included in the system of FIGURE 1.

If the variable gain amplifier 14 has a gain characteristic as shown in FIGURE 2, constant amplitude oscillations will be generated. In FIGURE 2, the output voltage of the fundamental frequency component of variable gain amplifier 14 is plotted as a function of input voltage. The gain characteristic has three regions, a linear region and two saturation regions. The linear region is symmetrical about the origin of the graph and the gain in this region, that is, the ratio of the output voltage to the input voltage, is some constant non-zero value. In the saturation regions of the curve, the ratio of the output voltage ($E_o$) to the input voltage is not constant and decreases toward zero for arbitrarily large values of input voltage $E_{in}$. The saturation voltage is designated $E_S$. The voltage $E_S$ may be positive or negative depending upon the sign of the input voltage. The saturation level is chosen such that it is within the linear capability of all the circuit components in the system of FIGURE 1. In other words, variable gain amplifier 14 saturates before any other component in the system. The gain in the linear region of the curve or characteristic is chosen so as to always provide sufficient overall loop gain to cause oscillation regardless of the particular value of capacitor 38. It can also be seen that this gain characteristic provides (at least to the first order) the following property:

$$A \approx E_o / |E_{in}|$$

where A is gain, $E_o$ is the fundamental frequency output voltage and $|E_{in}|$ is the magnitude of the input voltage. This relationship implies a basically stable oscillation loop because the loop gain is determined by the amplitude and as the amplitude of the input voltage increases, the gain decreases. This is a form of negative feedback and it provides loop stability.

If the average amplitude of the input voltage to variable gain amplifier 14 is held constant, the gain A is given by the following equation:

$$A = \frac{2}{\pi}[\sin^{-1} E_S + E_S(1 - E_S^2)^{1/2}] \angle 0°$$

Figure 3:
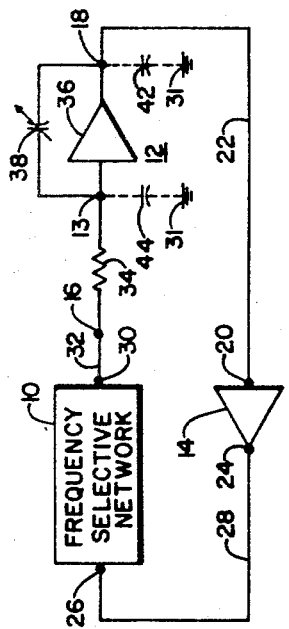
FIGURE 3 is a graph showing the necessary relationship between the output voltage and the gain of the variable gain amplifier included in the system of FIGURE 1.

The graph of FIGURE 3 shows the voltage $E_S$ plotted as a function of gain A. For values of A less than 0.5, $E_S$ is almost directly proportional to the gain A. The term gain A applies only to the fundamental component of frequency and not the harmonics produced by any limiting action. For gains between 0.2 and 0.4 the non-linearity is less than 0.8 percent. The circuit realization of the graph of FIGURE 3 is shown in a schematic diagram of the variable gain amplifier in FIGURE 4.

The input terminal 20 of variable gain amplifier 14 is connected to the anode of a diode 62. The cathode of diode 62 is connected to a terminal 66. A resistor 64 is connected between terminal 66 and ground potential 31. A second resistor 68 is tied between terminal 66 and input terminal 70 of a difference amplifier 72. Terminal 70 is the inverting terminal of difference amplifier 72. Terminal 74 is the non-inverting terminal of amplifier 72. A source of D-C voltage 76, designated $V_{REF}$, is connected to terminal 74. Amplifier 72 has an output terminal 78 which is connected to a terminal 80. An A-C feedback capacitor 86 is connected between terminal 80 and input terminal 70 of amplifier 72. A pair of diodes 82 and 84 is tied between terminal 80 and ground potential 31. Terminal 80 is connected to the cathode of diode 82 the anode of which is tied to a terminal 90. The cathode of diode 84 is connected to terminal 90 and the anode of diode 84 is connected to ground reference potential 31. Terminal 90 is connected by means of a lead to terminal 24 which is the output terminal of the variable gain amplifier. Terminal 24 is connected by means of lead 28 to input terminal 26 of the frequency selector network 10. Terminal 20 is also connected to one side of a capacitor 60. A resistor 88 is connected from the other side of capacitor 60 to output terminal 24.

Figure 4:
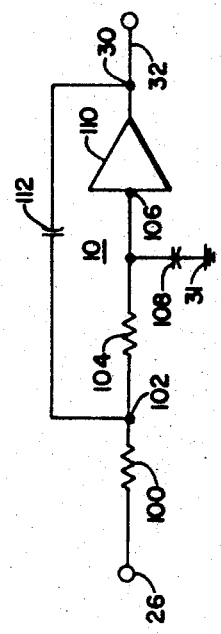
FIGURE 4 is a schematic diagram of the circuit realization of the variable gain amplifier characterized by the graph of FIGURE 3.

The input signal to the variable gain amplifier circuit 14 of FIGURE 4 is applied at terminal 20. The signal varies about a zero D-C reference potential and is sinusoidal with very little distortion. Diode 62 and resistor 64 act to rectify the A-C signal at terminal 20. Therefore, the signal at terminal 66 is a half wave rectified signal having some average D-C level. The difference between this average level and the D-C reference signal 76 ($V_{REF}$) is integrated by the circuit comprising resistor 68, amplifier 72 and capacitor 86. The integrated quantity appears at terminal 80. For example, as the average level of the signal at terminal 66 increases, the D-C potential at terminal 80 decreases by an amount proportional to the integral of the difference of the average signal at terminal 66 and the reference potential 76 connected to terminal 74 in accordance with the following equation:

$$e_o = -\frac{1}{RC} \int (e_{\text{avg}} - V_{\text{REF}}) dt$$

where $e_o$ is the voltage at terminal 80, R is the resistance of resistor 68, C is the capacitance of capacitor 86, $e_{\text{avg}}$ is the average voltage at terminal 66, and $V_{\text{REF}}$ is the reference voltage 76 which is connected to terminal 74 of amplifier 72.

The D-C voltage which is developed at terminal 80 is divided into two equal parts by diodes 82 and 84. For example, if the D-C voltage at terminal 80 is 10 volts positive, the potential at terminal 90 between diodes 82 and 84 is, on the average, at 5 volts D-C positive. Diodes 82 and 84 act to clip the A-C signal which is transmitted from terminal 20 through coupling capacitor 60 and resistor 88 to terminal 24. The A-C signal coupled through capacitor 60 at resistor 88 from terminal 20 to terminal 28 swings about the D-C potential at terminal 90, is clipped at ground potential by diode 84, and is clipped at the D-C potential of terminal 80 by diode 82 (neglecting the drops across diodes 82 and 84). As the amplitude of the A-C signal at terminal 20 tends to increase, the D-C potential at terminal 80 decreases and the amplitude of the clipped wave at terminal 24 decreases. In this way, as the A-C signal at terminal 20 tends to increase, the fundamental component of the A-C signal at terminal 24 is decreased. In this respect, the circuit of FIGURE 4 acts like a variable gain amplifier. When the gain of the circuit is at a maximum, the D-C potential at terminal 80 is at a maximum and vice versa.

Since the signal on lead 28 is fed through the frequency selective network 10 and integrator circuit 12 back to input terminal 20 of variable gain amplifier 14, the net result is to hold the average of the input sine wave at terminal 20 to a constant level equal to the reference potential $V_{\text{REF}}$ by properly changing the D-C output voltage or saturation level at terminal 80. The maximum peak-to-peak output voltage at terminal 24 is given by the output D-C voltage at terminal 80 (neglecting diode drops) which is proportional to the average gain of variable gain amplifier circuit 14. The circuit of FIGURE 4 allows the level of oscillation to be maintained at a predetermined constant value.

Although the input signal to the variable gain amplifier 14 is nearly a perfect sinusoid, the output signal at terminal 24 is not. It is generally a symmetrically clipped sinusoid. It is necessary therefore that the remainder of the oscillatory loop, that is, network 10 and integrator 12 sufficiently filter the waveform so that it is nearly a perfect sinusoid when it reaches the tank unit (capacitor 38). This minimizes radio frequency interference problems and also assures that the input signal at terminal 20 of the variable gain amplifier 14 is a perfect sinusoid as assumed. Filtering is accomplished with the proper choice of frequency selective network 10. In addition to acting as a filter, the cut-off frequency of selective network 10 determines the frequency of oscillation. Referring to FIGURE 1, if the frequency selective network is a second order low pass filter, it has a $-90°$ phase shift at the cut-off frequency. Integrating circuit 12 has a $+90°$ phase shift and the variable gain amplifier 14 has no phase shift. Therefore, the total phase shift around the loop is zero degrees and a loop gain of one will produce oscillations. The non-sinusoidal waveform produced at output terminal 24 of variable gain amplifier 14 sees three sections of filtering, two in network 10 and one in integrator 12, before it is applied to the tank unit 38. Since the variable gain amplifier 14 saturates symmetrically only odd harmonics are present in the output waveform and these are then sufficiently attentuated by the filtering action.

Figure 5:
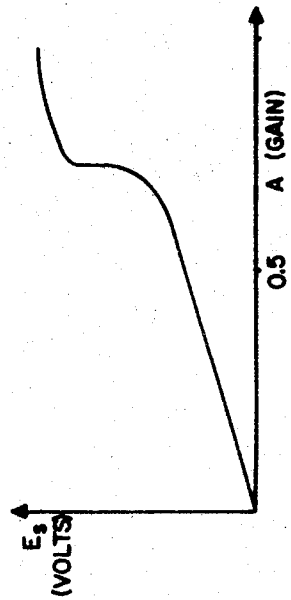
FIGURE 5 is a schematic diagram of a frequency selective network included in the system of FIGURE 1; and, FIGURE 6 is a schematic diagram of the system shown in FIGURE 1.

FIGURE 5 is a schematic diagram of a straightforward second order low pass active filter which is used for the frequency selective network 10. A resistor 100 is connected between input terminal 26 and a terminal 102. A second resistor 104 is connected from terminal 102 to input terminal 106 of an amplifier 110. A capacitor 108 is connected from input terminal 106 to ground reference potential 31. A capacitor 112 is connected between an output terminal 30 of amplifier 110 and terminal 102. Output lead 32 is connected to output terminal 30. The gain of amplifier 110 is designated +1.

The transfer equation for the circuit of FIGURE 5 is given by the following equation:

$$\frac{E_o}{E_{\text{in}}} = \frac{1}{\beta R^2 C^2 s^2 + 2RCs + 1}$$

where $\beta$ is the ratio of capacitors 112 and 108, R is the resistance of resistors 100 and 104, and C is the capacitance of capacitor 108. Other parameters of interest are given by the following equations:

$$\omega_c = \frac{1}{\sqrt{\beta} RC}$$

$$\zeta = \frac{1}{\sqrt{\beta}}$$

$$G|\omega_c = \frac{E_o}{E_{\text{in}}}\bigg|\omega_c = \frac{\sqrt{\beta}}{2} \angle -90°$$

where $\omega_c$ is the cut-off frequency, in radians per second, of the low pass filter, $\zeta$ is the damping factor of the circuit, and G is the gain of the circuit which in this case has been computed at the cut-off frequency $\omega_c$. Thus it is seen that the cut-off frequency, damping factor and the gain at the cut-off frequency are set by the values selected for resistors 100 and 104 and capacitors 108 and 112. Note that resistors 100 and 104 have the same value.

In a particular application of a $\beta$ of 16 and an $\omega_c$ corresponding to 4000 cycles per second were chosen. Therefore the gain of the frequency selective network 10 at the oscillation frequency is two. For an overall loop gain of unity, the gains were distributed according to the following table:

|            | Empty tank | Full tank |
|---|---|---|
| Network 10 | 2.0 | 2.0 |
| V.G. Amp 14 | 0.2 | 0.4 |
| Integrator 12 | 2.5 | 1.25 | where the term empty tank refers to the situation when capacitor 38 has its minimum capacity and the term full tank refers to the situation when capacitor 38 has maximum capacity. Since the product of the individual gains equals 1 and since the gain of integrator 12 is inversely proportional to the capacity of capacitor 38, the gain of the variable gain amplifier 14 is proportional to the capacity of capacitor 38. In a typical situation, the open loop gain of integrator circuit 12 is 2600 and the ratio of open to closed loop gain of integrator circuit 12 is greater than 1000. This will provide sufficient stability. The envelope of the oscillations are determined solely by variable gain amplifier 14 and is therefore a constant value. The output indication is determined by the level of saturation of amplifier 14 and the value of the average input voltage thereto.

Figure 6:
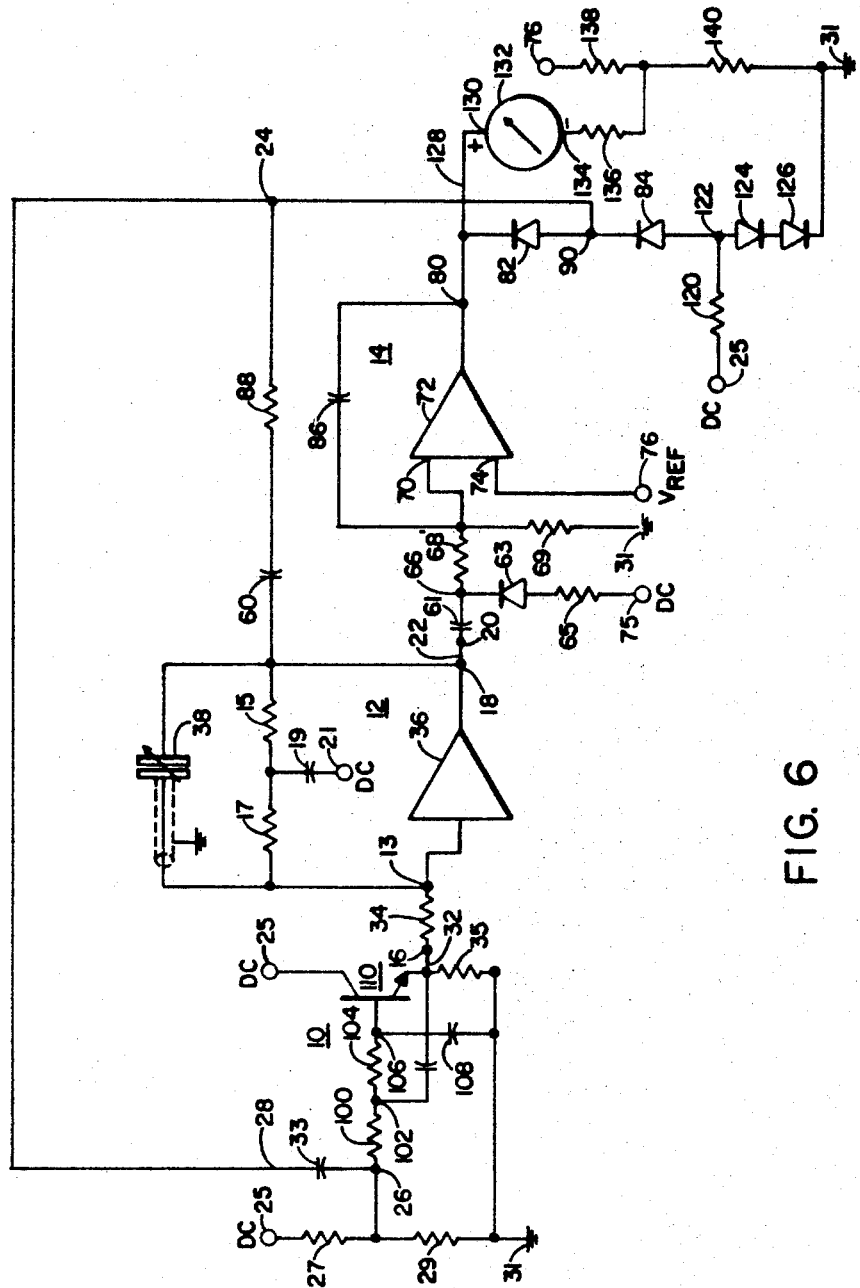

FIGURE 6 is a schematic diagram of the overall system showing some portions in greater detail, adding some components, and exhibiting minor modifications.

Amplifier 110 in network 10 is shown as a transistor having collector, base, and emitter terminals. The collector is connected to a source of D-C potential 25, the base is connected to terminal 106, and the emitter is tied to one end of a resistor 35, the other end of which is tied to ground reference potential 31. The junction point between the emitter of the transistor and resistor 35 is tied to the output terminal 16 of network 10. A coupling capacitor 33 (not shown in FIGURE 1) connects lead 28 to input terminal 26 of network 10. Input terminal 26 is also connected to the midpoint of a voltage divider comprised of a pair of series resistors 27 and 29. Resistors 27 and 29 are connected between the D-C reference potential 25 and ground reference potential 31 and provide the proper biasing for the transistor of amplifier 110.

A pair of series resistors 15 and 17 are tied between output terminal 18 and input terminal 13 of integrator 12. A capacitor 19 is tied between a source of D-C potential 21 and a junction point common to resistors 15 and 17. Resistors 15 and 17 and capacitor 19 provide an integrator 12 which has unity D-C gain and open loop A-C gain.

The input circuitry of the integrator 14 of FIGURE 6 is slightly different from that shown in FIGURE 4. In FIGURE 6 a capacitor 61 is tied between input terminal 20 and terminal 66. A series circuit comprising a diode 63 and a resistor 65 are tied between terminal 66 and a source of positive D-C reference potential 75. The cathode of diode 63 is tied to terminal 66. A resistor 68', corresponding to resistor 68 in FIGURE 4, is tied between terminal 66 and input terminal 70 of amplifier 72. A resistor 69 is tied from input terminal 70 to ground reference potential 31 and forms a voltage divider network with resistor 68'.

The D-C potential at terminals 18 and 20 is some value V. The D-C potential at terminal 66 depends upon the ratio of the resistance of resistor 65 to the sum of the resistances of resistors 68' and 69. This is neglecting the voltage drop across diode 63. The voltage at terminals 18 and 20 is an A-C voltage having some peak-to-peak value and an average D-C value of V. Eventually, capacitor 61 charges to a voltage representing the difference in voltage between the positive D-C potential at terminal 66 and the negative peak of the voltage present at terminal 18. Therefore, for example, if the normal D-C potential at terminal 66 is 6.8 volts and the A-C voltage at terminal 18 has a peak-to-peak value of 10 volts, capacitor 61 charges up to approximately 11.8.–V volts positive to negative from right to left on the capacitor 61. Whereas the A-C voltage swings about V D-C potential at terminal 20, it swings about an 11.8 volt D-C potential at terminal 66. Under normal oscillating conditions, resistors 68' and 69 form a voltage divider so that the D-C potential at input terminal 70 of amplifier 72 is the same as the D-C potential at input terminal 74 of that amplifier. In effect, the A-C component of the signal present at input terminal 70 is nullified by negative feedback provided by capacitor 86. In other words, changes in signal amplitude at terminal 18 are converted into D-C level changes at input terminal 70 and a D-C signal is generated at terminal 80 which represents the integral of the D-C level changes at terminal 70.

The anode of diode 84 is tied to a terminal 122. Terminal 122 is connected to a source of D-C potential 25 through a resistor 120. A series circuit comprising diodes 124 and 126 are connected between terminal 122 and ground reference potential 31. Assuming potential 25 is positive, diodes 124 and 126 are connected such that current flows from potential source 25 through resistor 120 to terminal 122 and through positively biased diodes 124 and 126 to ground reference potential 31.

The purpose of diodes 124 and 126 is to raise the D-C potential at terminal 90 by an amount equivalent to the voltage drop ordinarily occurring across diodes 82 and 84. Note that diodes 82, 84, 124, and 126 are of the same type, diodes 82 and 84 are matched, and the sum of the voltage drops across diodes 124 and 126 is equal and opposite to that across diodes 82 and 84. A comparison of the circuits in FIGURE 4 and FIGURE 6 will clarify the purpose of diodes 124 and 126. In FIGURE 4 assume the D-C potential at terminal 80 is 10 volts, then the potential at terminal 90 is, on the average, 5 volts, and the A-C signal at terminal 24 swings about 5 volts to a maximum value of 10.6 volts and a minimum value of −0.6 volt because 0.6 volt is a typical voltage drop across diodes 82 and 84. This represents a total possible maximum swing of 11.2 volts, that is, 10.6 volts minus −0.6 volt. However, it is desired to have an A-C swing more nearly equal to the D-C potential at terminal 80. In FIGURE 6 then, when terminal 80 is at 10 volts D-C, terminal 90 is, on the average, at 5.6 volts, which is halfway between the 10 volt potential at terminal 80 and the 1.2 volt potential at terminal 122. Therefore the A-C signal at terminal 24 swings about a D-C level of 5.6 volts to a maximum of 10.6 volts and a minimum 0.6 volt, a total swing of 10 volts which is equal to the 10 volt D-C potential at terminal 80. In effect, diodes 124 and 126 compensate for the voltage drops across diodes 82 and 84. Temperature compensation is affected in like manner since the change in voltage drop across any diode will inherently be the same as in the other diodes.

A lead 128 connects terminal 80 to a positive input terminal 130 of a meter indicator 132. A resistor 136 is tied between a negative output terminal 134 of meter 132 and the midpoint of a voltage divider network comprised of a pair of series resistors 138 and 140. Resistors 138 and 140 are tied in series between a source of D-C potential 76 and ground reference potential 31. The voltage developed at the midpoint of this voltage divider offsets the empty tank voltage which is present at terminal 80 when the tank is empty and capacitor 38 has its minimum capacity.

Although a single general embodiment of the present invention has been illustrated and described in detail, it is to be understood that the invention is not limited thereto. Various changes can be made in the design and arrangement of the parts without departing from the spirit and scope of the invention.

What is claimed is:
1. A self-oscillating measurement loop comprising:
   a fixed impedance having input and output terminals;
   a first amplifier having input and output terminals, the input terminal connected to the output terminal of the fixed impedance;
   a variable impedance to be measured having input and output terminals, the input terminal connected to the input terminal of the first amplifier and the output terminal connected to the output terminal of the first amplifier, the gain of the combination comprising the fixed impedance, first amplifier, and variable impedance, being proportional to the variable impedance at some predetermined first phase angle;
   a second amplifier having input and output terminals, the input terminal connected to the output terminal of the first amplifier, the second amplifier having a variable gain at a predetermined second phase angle and including means for developing a signal proportional to the gain thereof; and
   a frequency selective network having input and output terminals, the input terminal connected to the output terminal of the second amplifier and the output terminal connected to the input terminal of the fixed impedance, the network having a predetermined gain at a predetermined third phase angle and associated frequency, the algebraic sum of the first, second and third phase angles substantially equal to zero degrees, and means for controlling the gain of the second amplifier so that the overall gain of the loop comprising the fixed impedance, first amplifier, variable impedance, second amplifier, and frequency selective network is continuously equal to a predetermined constant, and means for maintaining the loop in a condition of sustained oscillation.

2. The system of claim 1 wherein the fixed impedance is a resistor and the variable impedance is a capacitor adapted to be immersed in a fluid, the impedance of the capacitor varying with the degree of immersion.

3. The system of claim 1 wherein the variable gain amplifier comprises:
  means for developing a first signal having an average value proportional to the amplitude of the loop oscillations;
  means for producing a predetermined first reference signal;
  means for integrating the difference of the first signal and the reference signal; and
  means for limiting the oscillations to a peak-to-peak level determined by the integrated difference.

4. The system of claim 3 wherein the means for developing a first signal having an average proportional to the amplitude of the loop oscillations is a half-wave rectifier circuit.

5. The system of clam 3 wherein the means for developing a first signal having an average proportional to the amplitude of the loop oscillations comprises:
  a predetermined second reference signal source having an output terminal; and,
  a series circuit comprising a diode and a capacitor, the series circuit connected between the output terminal of the second reference signal source and the output terminal from the first amplifier, the capacitor charging up to a potential which has a fixed component dependent upon the second reference signal and a variable component proportional to the peak amplitude of the loop oscillations, the loop oscillations thereby superimposed on the potential to which the capacitor has charged.

6. The system of claim 1 wherein the frequency selective network is a low pass filter having a predetermined cut-off frequency which determines the frequency of the loop oscillations.

7. The system of claim 6 wherein the cut-off frequency of the low pass filter and therefore the frequency of the loop oscillations is about 4000 cycles per second.

8. The system of claim 6 wherein the low pass filter is an active one.

9. The system of claim 8 wherein the low pass active filter has a gain of two.

10. The system of claim 1 wherein the phase angle associated with the second amplifier is substantially zero degrees.

11. The system of claim 1 in combination with an indicating means connected to the means for developing a signal proportional to the gain of the second amplifier and indicating the magnitude thereof.

References Cited

UNITED STATES PATENTS

| | | | |
|---|---|---|---|
| 3,042,908 | 7/1962 | Pearson | 340—244 |
| 3,254,333 | 5/1966 | Baumdel | 73—304 XR |
| 3,344,668 | 10/1967 | Schuck | 73—304 |

LOUIS R. PRINCE, *Primary Examiner.*

D. O. WOODIEL, *Assistant Examiner.*

U.S. Cl. X.R.

324—61